United States Patent [19]

Suzuki et al.

[11] Patent Number: 4,682,872
[45] Date of Patent: Jul. 28, 1987

[54] SIGNAL PROCESSING APPARATUS FOR A SEMICONDUCTOR POSITION SENSING DEVICE

[75] Inventors: Ryoichi Suzuki, Yokohama; Hideo Taka, Tokyo; Shuichi Tamura, Yokohama, all of Japan

[73] Assignee: Canon Kabushiki Kaisha, Tokyo, Japan

[21] Appl. No.: 669,088

[22] Filed: Nov. 7, 1984

[30] Foreign Application Priority Data

Nov. 11, 1983 [JP] Japan ............................ 58-211901

[51] Int. Cl.⁴ .................... G03B 3/00; G01C 3/10
[52] U.S. Cl. ..................... 354/403; 250/214 R; 356/1; 364/561
[58] Field of Search .......... 354/402, 403, 404, 405; 356/1, 376; 250/201 DF, 206, 214 RC; 307/311; 324/63, 64; 364/561

[56] References Cited

U.S. PATENT DOCUMENTS

| | | | |
|---|---|---|---|
| 3,848,185 | 11/1974 | Hentchel | 324/63 |
| 3,974,375 | 8/1976 | Sturm | 250/206 |
| 4,338,515 | 7/1982 | Herbst et al. | 307/311 |
| 4,425,031 | 1/1984 | Tamura et al. | 354/403 |
| 4,429,967 | 2/1984 | Tokyda | 354/403 |
| 4,445,029 | 4/1984 | Nagaoka et al. | 356/1 |
| 4,453,812 | 6/1984 | Suzuki et al. | 354/403 |
| 4,527,892 | 7/1985 | Yamane et al. | 354/403 |
| 4,545,665 | 10/1985 | Aihara | 354/403 |
| 4,615,616 | 10/1986 | Shiomi | 354/403 |

Primary Examiner—Parshotam S. Lall
Assistant Examiner—Daniel W. Juffernbruch
Attorney, Agent, or Firm—Fitzpatrick, Cella, Harper & Scinto

[57] ABSTRACT

A signal processing apparatus for a semiconductor position sensing device has an impedance element connected to one output terminal thereof. When a distance to an object is to be detected, an impedance of the impedance element is varied until the outputs of the sensing device substantially balance. The distance to the object is determined by the impedance of the impedance element when the outputs balance.

13 Claims, 15 Drawing Figures

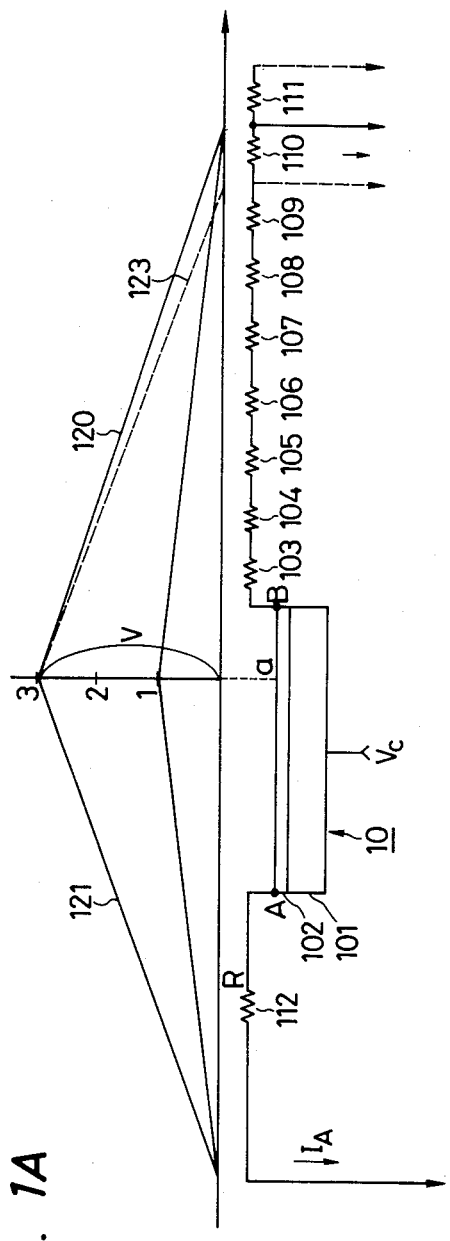
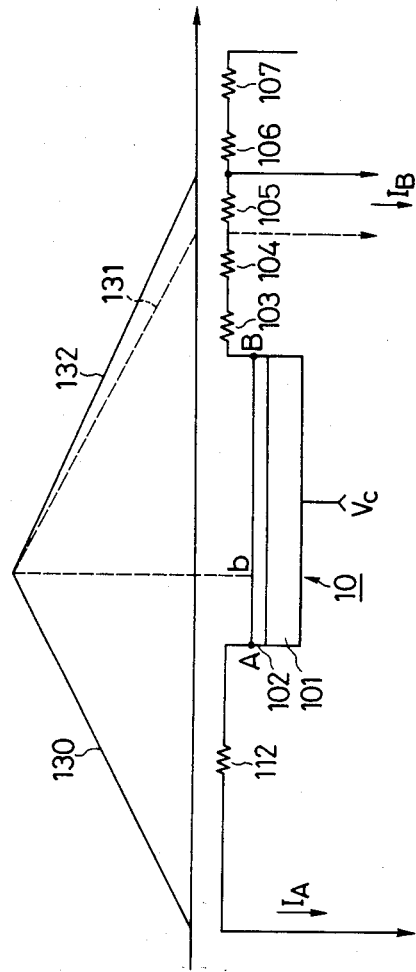
FIG. 1A
FIG. 1B

| FIG. 9A | FIG. 9B |

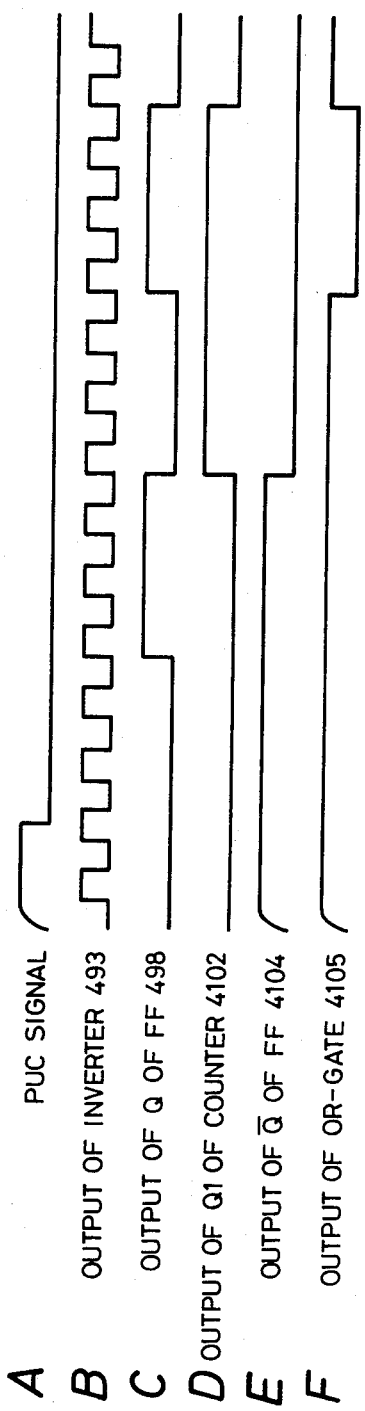

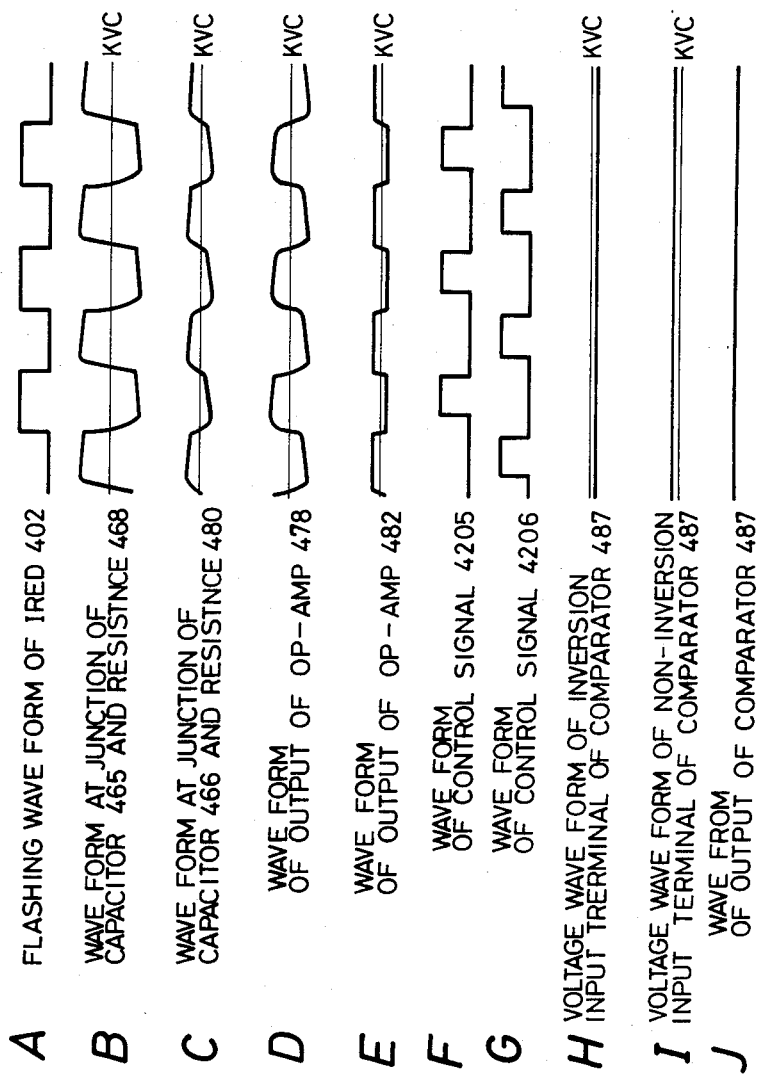

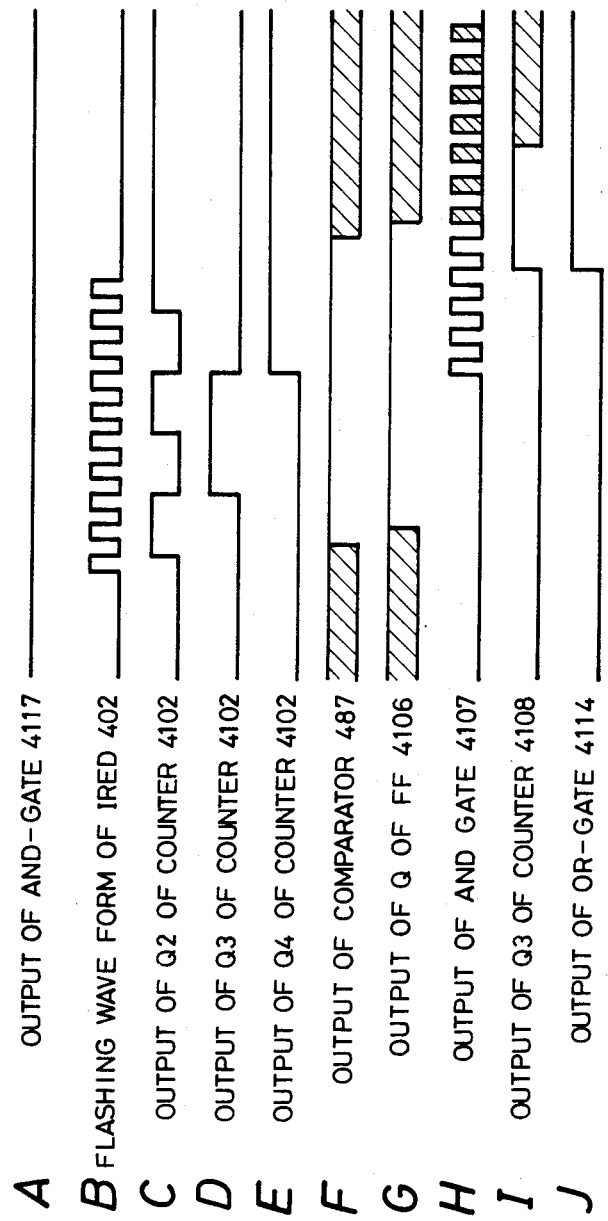
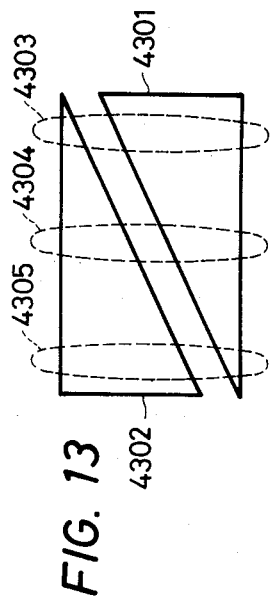
FIG. 12
A  OUTPUT OF AND-GATE 4117
B  FLASHING WAVE FORM OF IRED 402
C  OUTPUT OF Q2 OF COUNTER 4102
D  OUTPUT OF Q3 OF COUNTER 4102
E  OUTPUT OF Q4 OF COUNTER 4102
F  OUTPUT OF COMPARATOR 487
G  OUTPUT OF Q OF FF 4106
H  OUTPUT OF AND GATE 4107
I  OUTPUT OF Q3 OF COUNTER 4108
J  OUTPUT OF OR-GATE 4114
FIG. 13

SIGNAL PROCESSING APPARATUS FOR A SEMICONDUCTOR POSITION SENSING DEVICE

BACKGROUND OF THE INVENTION

1. Field of the Invention

The present invention relates to a signal processing apparatus for a photo-semiconductor position sensing device, and more particularly to a distance measuring device for a camera which uses a semiconductor position sensing device (PSD).

2. Description of the Prior Art

A distance measuring device for measuring a distance by a principle of triangulation based on a predetermined distance (base line length) and an angle between a light emitting element and a photosensing element by arranging the light emitting element and the photosensing element in spaced relation from each other by the base line length and scanning one of the light emitting element and the photosensing element so that the light emitted by the light emitting element and reflected by an object is sensed by the photosensing element, has been well known. However, this method needs a mechanism for scanning the light emitting element on the photosensing element, and when the distance measuring device is used in the camera, it is necessary to synchronize the drive of a distance ring of an imaging lens to the scan. Accordingly, the distance information cannot be obtained prior to shutter release operation. As a result, prefocus photographing in which a distance to an object in a view field of a finder is measured prior to the shutter release operation is hard to attain.

In this respect, a distance measuring device which requires no scan mechanism and allows prefocusing has been known. It uses an array of a plurality of light emitting elements or photosensing elements instead of scanning the element and measures the distance by the principle of triangulation. However, the arrangement of the plurality of light emitting elements or photosensing elements not only increases the cost but also complicates the circuit for driving the light emitting elements and/or complicates the detector for detecting signals from the plurality of photosensing elements. Accordingly, this method is hard to apply to a compact camera.

A camera which incorporates a distance measuring device as disclosed in Japanese Patent Application Laid-Open No. 95210/1983 has also been known. In this Patent Application, a light emitting device for projecting a light to an object and a semiconductor position sensing device (PSD) for producing a first and second current outputs having a mutual current ratio determined by an incident position of the light emitted by the light emitting device and reflected by the object are provided so that the distance is measured based on the first and second current outputs.

This distance measuring device is advantageous in that the PSD is relatively inexpensive and a processing circuit therefor is simpler than that for the plurality of photosensors. However, it has the following disadvantage.

In the prior art method, the output current of the PSD is affected by the intensity of the spot light impinged on the PSD such that the output current is high when the light reflected by the object is strong and the output current is low when the length reflected by the object is weak. Accordingly, it is necessary to normalize the output current of the PSD by dividing it by a sum of the first and second current outputs of the PSD. Thus, the signal processing circuit is complex and a wide dynamic range of the signal processing circuit is required because the output current of the PSD is significantly changed with the intensity of the incident spot light even though the output current of the PSD is normalized by the sum of the first and second current outputs of the PSD. Accordingly, if the signal processing circuit is constructed by discrete components, the selection range for an operational amplifier is narrowed, and if it is constructed by a monolithic chip, the circuit is further complicated because a signal compression circuit is required to widen the dynamic range.

SUMMARY OF THE INVENTION

It is an object of the present invention to provide a signal processing apparatus for a PSD which overcomes the disadvantages of the prior art PSD signal processing apparatus and attains high accuracy with simple construction.

It is another object of the present invention to provide a signal processing apparatus capable of continuously varying the impedance of an impedance element.

Other objects of the present invention will be apparent from the following description of the invention.

BRIEF DESCRIPTION OF THE DRAWINGS

FIGS. 1A and 1B illustrates a principle of the present invention,

FIGS. 7 to 12 shows a fifth embodiment in which;

FIG. 7 shows a PSD,

FIG. 8 shows a principle of the fifth embodiment;

FIG. 9 is a circuit diagram, and

FIGS. 10-12 are time charts, and

FIG. 13 is a schematic view of a photosensing device of a sixth embodiment.

DETAILED DESCRIPTION OF THE PREFERRED EMBODIMENTS

Figure 2:
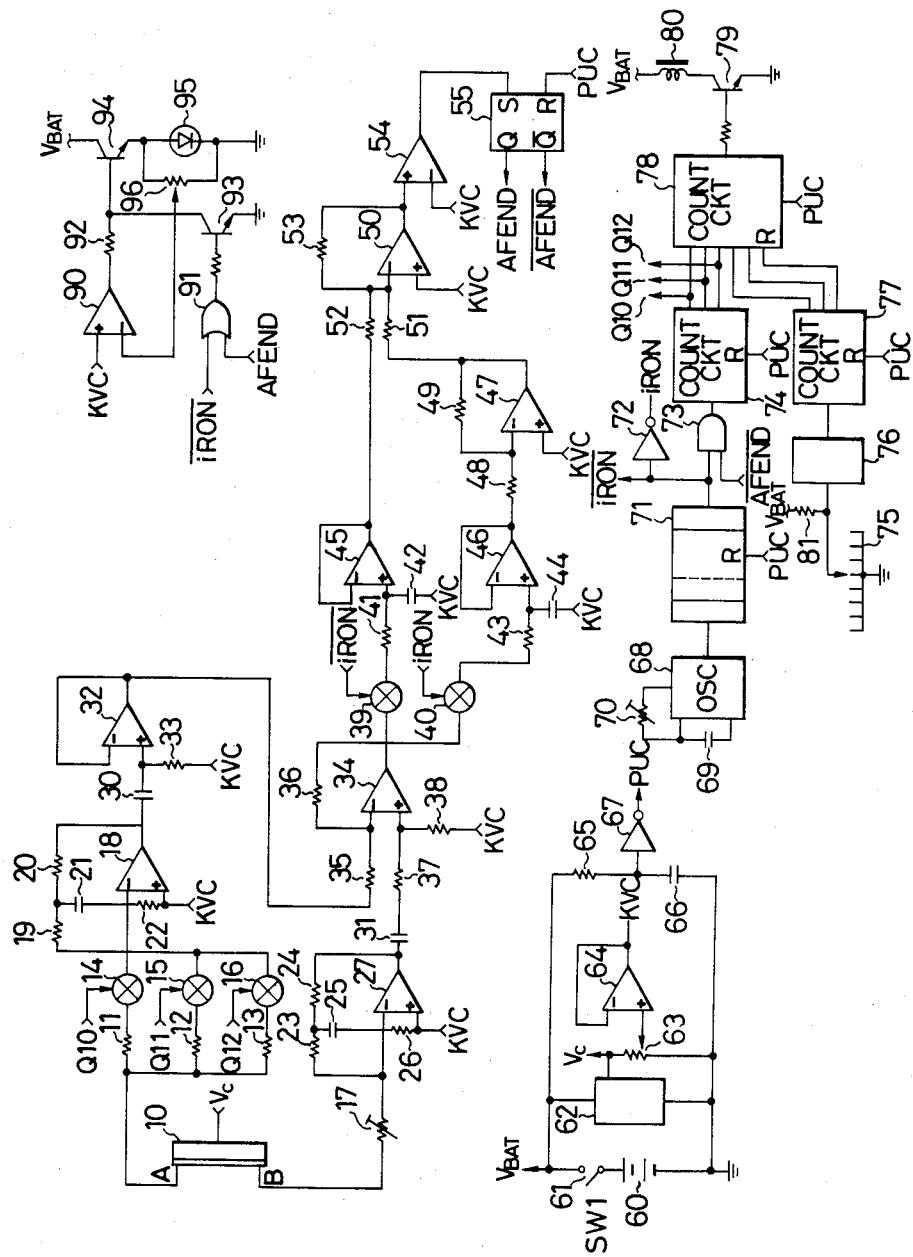
FIG. 2 is a circuit diagram of a first embodiment of a camera in accordance with the present invention.

FIGS. 1A and 1B illustrate a principle of the present invention. In FIGS. 1A and 1B, numeral 10 denotes a PSD, numeral 101 denotes an N-type semiconductor layer, numeral 102 denotes a P-type semiconductor layer having a lateral equivalent resistance, numerals 103–111 denotes resistors of equal resistance connected in series to one output terminal B of the PSD 10, and numeral 112 denotes a resistor connected to another output terminal A of the PSD 10. A reference voltage Vc is applied to a common input terminal of the PSD 10.

Assuming that a light emitted by a light emitting element and reflected by an object is impinged to a point a on the PSD 10, the current which flows from the terminal A through the resistor 112 by the spot light corresponds to the voltage generated at the point a by the spot light, divided by the sum of a the resistance of the p-type semiconductor layer between the point a and the terminal A and the resistance of the resistor 112.

Accordingly, it is represented by the gradient of line 121.

Similarly, the current which flows from the terminal B and is taken out of the junction of the resistors 109 and 110 is represented by the gradient of line 123. The gradient of the line 121 shown in FIG. 1 is 3/8.75 and the gradient of the line 123 is 3/8.25. Accordingly, the current $I_B$ is larger than the current $I_A$. If the output current $I_B$ is taken out of the junction of the resistors 110 and 111, the current corresponds to the gradient of the line 120, that is, 3/9.25. Accordingly, the current $I_B$ is smaller than the current $I_A$. Thus, the current $I_B$ may be larger or smaller than the current $I_A$ depending on the resistance of the resistors connected to the output terminal B. In other words, the position of the point a can be determined by sequentially connecting the resistors to the output terminal B and determining the resistance of the resistors when $I_A$ and $I_B$ coincide or when the magnitude relation of $I_A$ and $I_B$ is reversed by connecting the resistor.

Assuming that the light of the light emitting element, reflected by the object, impinges at a point b on the PSD 10 as shown in FIG. 1B and if the current is taken out of the junction of the resistors 104 and 105, the current $I_B$ is larger than the current $I_A$. If the current $I_B$ is taken out of the junction of the resistors 105 and 106, the current $I_B$ is smaller than the current $I_A$.

Since the resistance of the resistors connected to the output terminal B at which the magnitude relation of the output currents $I_A$ and $I_B$ is reversed changes with the incident position of the reflected light, the incident position of the reflected light can be calculated from the resistance. In order to more precisely calculate the incident position of the reflected light, the resistance of the resistors is changed such that the current $I_A$ and $I_B$ perfectly match, and the incident position is calculated from that resistance. In accordance with this method, the signal processing apparatus need not have as wide a dynamic range as the prior art PSD signal processing apparatus has, because, in this method, the magnitudes of the output currents $I_A$ and $I_B$ are compared and the incident position of the reflected light is calculated from the resistance when the equality of the output currents $I_A$ and $I_B$ is detected. Thus, in principle, the signal processing apparatus need only determine the magnitude relation of the output currents $I_A$ and $I_B$ and even in the case, as shown in FIGS. 1A and 1B, that the change of the resistor value is performed by changing over the resistors among them, it need only produce exact information only when the difference between the output currents $I_A$ and $I_B$ is rendered small by the connection of the resistor.

FIG. 2 is a circuit diagram of one embodiment of a camera in accordance with the present invention. Numeral 10 denotes a PSD having a common electrode to which a reference voltage VC is applied and an output terminal A to which resistors 11, 12 and 13 having resistances 4R, 2R and R, respectively, are connected in parallel. Known analog switches 14, 15 and 16 are connected to the resistors 11, 12 and 13, respectively, and $Q_{10}$, $Q_{11}$ and $Q_{12}$ outputs of a counter 74 are connected to gates of the analog switches 14, 15 and 16, respectively.

In the present embodiment, unlike the principle illustrated in FIG. 1, the number of resistors parallelly connected to the output terminal A is varied so that the equivalent resistance of the resistors connected to the output terminal A is varied.

Numeral 17 denotes a potentiometer connected to an output terminal B of the PSD 10, numeral 18 denotes an operational amplifier which, together with frequency network resistors 19, 20 and 22 and a capacitor 21, constitutes a high-pass filter, numeral 30 denotes a DC blocking capacitor, numeral 33 denotes a resistor connected to a reference voltage KVC, numeral 32 denotes a buffering operational amplifier, numeral 27 denotes an operational amplifier which, together with frequency network resistors 23, 24 and 26 and a capacitor 25, constitutes a high-pass filter, numeral 34 denotes an operational amplifier which, together with resistors 35, 36, 37 and 38, constitutes a subtractor, numerals 39 and 40 denote analog switches connected to the output of the operational amplifier 34, which are alternately turned on and off in synchronism with the turn-on and turn-off of light emitting element 95, numerals 42 and 44 denote capacitors which, together with resistors 41 and 43, respectively, constitute sample-hold circuits for holding the outputs of the analog switches 39 and 40, respectively, numerals 45 and 46 denote buffering operational amplifiers, numeral 47 denotes an operational amplifier which, together with resistors 48 and 49, constitutes an inverting amplifier, numeral 50 denotes an operational amplifier which, together with resistors 51, 52 and 53, constitutes an adder for summing the outputs of the operational amplifiers 45 and 47, numeral 54 denotes a comparator for comparing the output of the operational amplifier 50 with the reference voltage KVc, numeral 55 denotes an RS flip-flop (RS-FF) which is reset by a PUC signal and set by the output of the comparator 54 and produces an AFEND signal indicating the end of auto-focus at a Q-output and an inverted signal $\overline{\text{AFEND}}$ at a $\overline{Q}$-output, numeral 60 denotes a power supply battery, numeral 61 denotes a switch SW1 which is closed in a first stroke of a shutter release button of the camera, numeral 62 denotes a circuit for generating the reference voltage Vc, numeral 63 denotes a potentiometer for dividing the voltage Vc, numeral 64 denotes a buffering operational amplifier which produces the reference voltage KVc derived by dividing the voltage Vc by the potentiometer 63, numeral 65 denotes a resistor which, together with a capacitor 66 and an inverter 67, constitutes a circuit for generating the PUC signal only for a short period after the turn-on of the switch SW1, numeral 68 denotes a known oscillator having a capacitor 69 and a potentiometer 70 for determining an oscillation frequency, numeral 71 denotes a frequency divider for producing a signal $\overline{\text{IRON}}$ to drive the light emitting device 95, numeral 72 denotes an inverter which inverts the signal $\overline{\text{IRON}}$ to produce a signal iRON, numeral 73 denotes an AND gate for ANDing the signal $\overline{\text{IRON}}$ with the signal $\overline{\text{AFEND}}$ of the RS-FF 55, numeral 74 denotes a counter which counts pulses from the AND gate 73, that is, the number of times of turn-on the light emitting device 95 prior to the end of distance measurement, numeral 75 denotes an encoder plate for generating a pulse as a lens bodytube (not shown) is moved, numeral 76 denotes a chattering absorbing circuit, numeral 77 denotes a counter, and numeral 78 denotes a coincidence circuit which changes its output from H-level to L-level when the counts of the counters 74 and 77 coincide.

Numeral 79 denotes a transistor which is driven by the output of the coincidence circuit 78. A magnet 80 for controlling the lens bodytube is connected to a collector of the transistor 79. As the magnet 80 is energized, the lens bodytube starts to move, and when the magnet 80 is deenergized, the lens bodytube is stopped. Numeral 9 denotes an operational amplifier having an inverting input terminal thereof connected to a voltage dividing point of a resistor 96 connected in parallel to the light emitting device 95 so that a constant voltage is always applied across the light emitting device 95 and a non-inverting input terminal connected to the reference voltage KVC, and numeral 94 denotes a transistor which is driven by the output of the operational amplifier 90 to control the current flowing into the light emitting device 95.

Numeral 91 denotes an OR gate which ORs the signal $\overline{\text{IRON}}$ with the signal $\overline{\text{AFEND}}$ and supplies its output to a base of a transistor 93 through a resistor. A collector of the transistor 93 is connected to the output of the operational amplifier 90 so that the transistor 94 is turned off when the transistor 93 is turned on.

The PUC signal is supplied to reset terminals of the frequency divider 71, counters 74 and 77, coindidence circuit 78 and RS-FF 55.

The operation of the present embodiment is now explained.

When the switch SW1 61 is closed in the first stroke of the shutter release button of the camera, the power is supplied to the circuits and the reference voltages VC and KVC are generated. The output of the inverter 67 is H-level for a moment before the charge in the capacitor 66 reaches a predetermined level and the signal PUC is generated. The frequency divider 71, the counters 74 and 77, the coincidence circuit 78 and the RS-FF 55 are reset to the initial states by the PUC signal. As the oscillator 68 starts the oscillation, the frequency divider 71 divides the pulse.

Since the RS-FF 55 was initially reset, the $\overline{Q}$-output is H-level and the AFEND signal is not present. Accordingly, the AND gate 73 gates the frequency-divided output and it is counted by the counter 74. As the counting proceeds, the Q10 output changes to H-level, the analog switch 14 is turned on and the photo-current produced by the PSD 10 by the light reflected by the object flows into the feedback loop of the operational amplifier 18 through the resistor 11.

On the other hand, at this moment, the $\overline{\text{IRON}}$ signal of the frequency divider 71 turns on and off the transistor 93 through the OR gate 91, and the driving transistor 94 is also turned on and off in synchronism thereto so that the light emitting device 95 turns on and off the light.

As the counting by the counter 74 further proceeds, the Q10 output chargers from H-level to L-level and the Q11 output changes from L-level to H-level. Accordingly, the analog switch 15 is turned on. As the counting by the counter 74 further proceeds, the Q10 and Q11 outputs are rendered H-level and the analog switches 14 and 15 are turned on. As the counting further proceeds, only the Q12 output is rendered H-level and the analog switch 16 is turned on. Thus, the resistors 11–13 are sequentially connected in parallel in a binary number manner, to the inverting input terminal of the operational amplifier 18. Accordingly, as the time elapses, a proportion of the current from the PSD 10 which flows into the operational amplifier 18 gradually increases, and the proportion of the current from the PSD 10 which flows into the operational amplifier 27 gradually decreases.

The output of the operational amplifier 18 is supplied to the buffer circuit 32 through the DC blocking capacitor 30, and the output of the buffer circuit 32 is supplied to the inverting input terminal of the differential amplifier 34 and the output of the operational amplifier 27 is supplied to the non-inverting input terminal of the differential amplifier 34 through the DC blocking capacitor 31. Accordingly, the operational amplifier 34 produces a difference between the two inputs thereto, that is, a difference between the currents from the two output terminals of the PSD 10.

The signal of the operational amplifier 34 during the turn-on period of the light emitting device 95 by the analog switches 39 and 40 is sampled and held in the capacitor 44, and the signal of the operational amplifier 34 during the turn-off period of the light emitting device 95 is sampled and held in the capacitor 42. The signals held in the capacitors 42 and 44 are outputted from the buffer amplifiers 45 and 46, and the output of the operational amplifier 46 is inverted by the operational amplifier 47 and the inverted output is applied to the operational amplifir 50. Accordingly, the output of the operational amplifier 50 is detected in synchronism with the turn-on and turn-off of the light emitting device 95 by the output of the operational amplifier 34. The difference between the output of the PSD 10 when the light emitting device 95 is turned on and turned off is produced by the operational amplifier 50. An external noise is eliminated.

As described above, as the time elapses, the current produced at the terminal A of the PSD 10 increases and the current from the terminal B of the PSD 10 decreases. Accordingly, the output of the operational amplifier 34 which produces the difference between the currents at the terminals A and B of the PSD 10 decreases. When the output of the operational amplifier 50 is reduced to the reference level KVC, the output of the comparator 54 changes from L-level to H-level. As a result, the RF-FF 55 is set and the Q output changes from L-level to H-level and the AFEND signal is generated. On the other hand, since the $\overline{\text{AFEND}}$ signal changes from H-level to L-level, the AND gate 73 is closed and the output pulse of the frequency divider 71 is no longer supplied to the counter 74. Accordingly, the states of the analog switches 14–16 when the output currents at the both output terminals of the PSD 10 are held in the counter 74.

When the AFEND signal is generated, the output of the OR gate 91 changes to H-level and the transistor 93 is kept on. Accordingly, the transistor 94 is turned off and the light emitting device 95 turn off the light.

As the shutter is then released by a mechanism (not shown), the magnet 80 is energized and the imaging lens (not shown) starts to move. In association with the movement, the encoder plate 75 produces a pulse sequence which is supplied to the counter 77 through the chattering absorbing circuit 76. When the count of the counter 77 and the count held in the counter 75 coincide, the output of the coincidence circuit 78 changes from H-level to L-level, the transistor 79 is turned off, and the magnet 80 is deenergized so that the movement of the imaging lens is terminated.

In accordance with the present embodiment, the counter 74 for frequency-dividing the output pulse of the frequency divider 71 is provided to switch the resistors connected to the terminal B of the PSD 10 by the analog switches. Accordingly, the distance information can be obtained in a form of digital information as compared with the prior art PSD signal processing apparatus which takes out the distance information in a form of analog information. This is very advantageous when the embodiment is applied to a zero focus type auto-focus camera in which the distance of movement of the imaging lens is detected in the form of a digital information to control the movement of the imaging lens.

Figure 3:
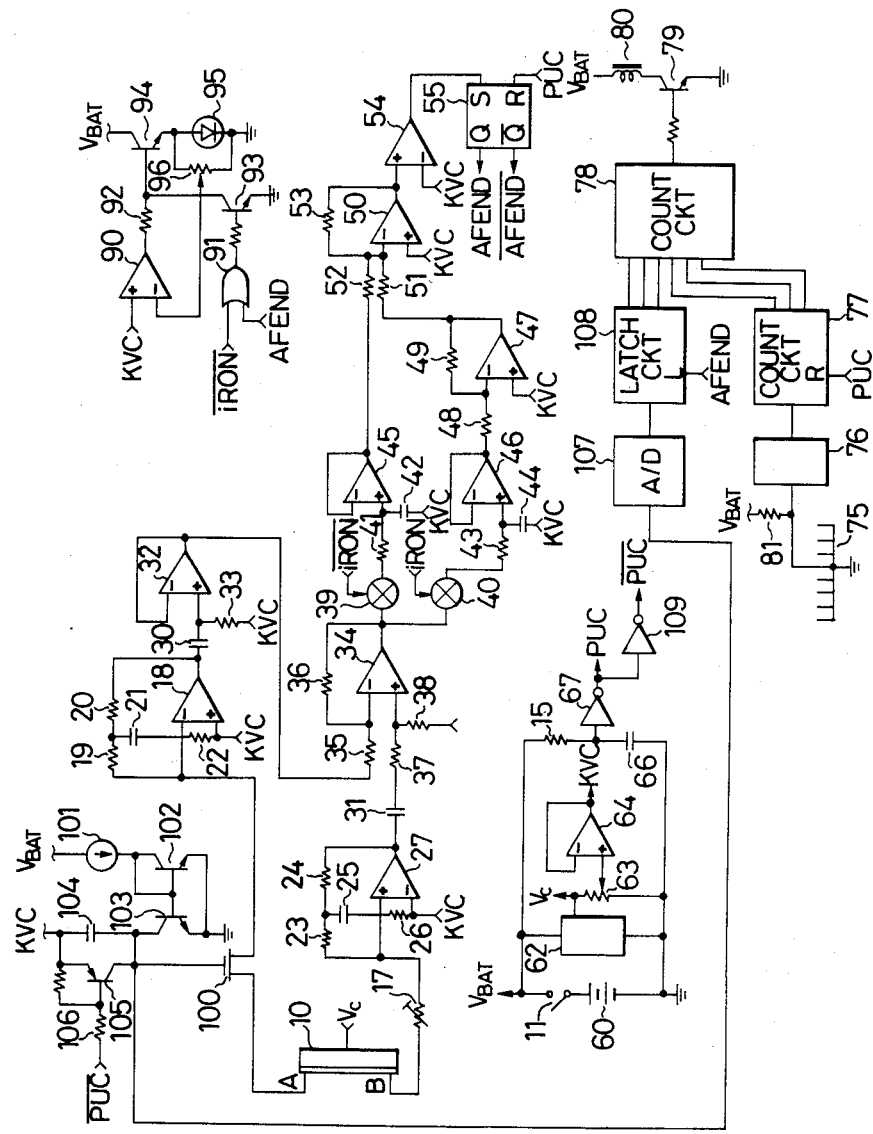
FIG. 3 is a circuit diagram of a second embodiment of the present invention.

Referring to FIG. 3, a second embodiment of the present invention is explained. In the second embodiment, instead of switching the resistors connected to the terminal of the PSD, and FET is provided and a gate voltage of the FET is controlled to change a resistance between a source and a drain in an analog fashion to balance the output currents from the terminals A and B of the PSD 10 in order to determine a point of the PSD at which the light emitted by the light emitting device and reflected by the object impinges. In FIG. 3, the like elements to those shown in FIG. 2 are designated by the like numerals and the explanation thereof is omitted. In FIG. 3, numeral 100 denotes a P-channel MOS FET having a source thereof connected to an inverting input terminal of an operational amplifier 18 and a drain thereof connected to a terminal A of a PSD 10. Numeral 101 denotes a constant current circuit, numerals 102 and 103 denote NPN transistors which constitute a current mirror circuit, numeral 104 denotes a capacitor, numeral 105 denotes a switching transistor having a $\overline{PUC}$ signal applied to a base thereof through a resistor 106. The capacitor 104 is connected between a reference voltage KVC and a gate of the FET 100.

Numeral 107 denotes a known A/D converter having the gate of the FET 100 connected to an input thereof, numeral 108 denotes a latch circuit having and AFEND signal applied to a latch input thereof, numeral 109 denotes an inverter which produces the $\overline{PUC}$ signal which is an inversion of a PUC signal.

An operation of the present embodiment is now explained. When a shutter release button (not shown) is depressed in a first stroke, a switch SW1 is closed and the $\overline{PUC}$ signal is momentarily rendered L-level by an inverter 109 so that the transistor 105 is turned on and the capacitor 104 is initially reset. After the resetting of the capacitor 104 by the $\overline{PUC}$ signal, the capacitor 104 is charged by the output of the constant current circuit 101 through the transistors 102 and 103 and the gate voltage of the FET 100 is gradually lowered from the reference voltage KVC. As a result, the resistance between the source and the drain of the FET 100 also gradually decreases and the output of the operational amplifier 50 gradually increases as is done in the embodiment of FIG. 2 so that the output of the comparator 54 changes from L-level to H-level, the RS-FF 55 is set and the Q-output thereof produces the AFEND signal. On the other hand, the gate voltage of the FET 100 is A/D converted by the A/D converter 107, and when the AFEND signal is generated, the output of the A/D converter 107 at that moment is latched in the latch circuit 108. This latched information is the distance information and the lens bodytube is controlled in the same manner as in the previous first embodiment.

In the present embodiment, since the FET is used as impedance means, the construction is simpler than that when the resistors are switched and the gate voltage of the FET can be precisely controlled by controlling the gate voltage of the FET to effectively switch the resistors so that the resistance can be continuously varied and the incident position of the reflected light can be precisely detected.

Figure 4:
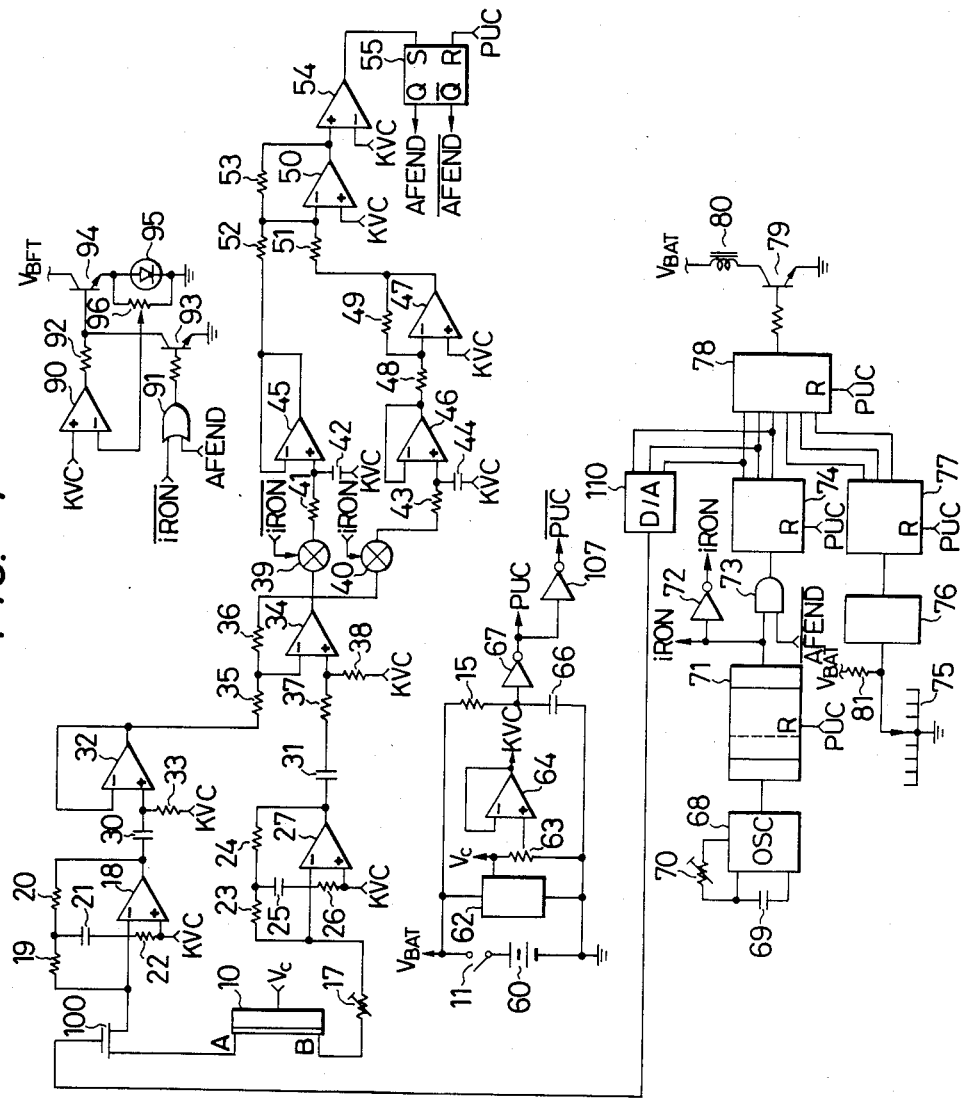
FIG. 4 is a circuit diagram of a third embodiment of the present invention.

FIG. 4 shows a circuit of a third embodiment of the present invention. In the present embodiment, instead of switching the resistors 11, 12 and 13 of the first embodiment, an FET 100 is provided and a voltage applied to a gate of the FET 100 is supplied by a known D/A converter 110 which D/A converts an output of a counter 74.

The operation is similar to those of the first and scond embodiment and the explanation thereof is omitted.

Figure 5:
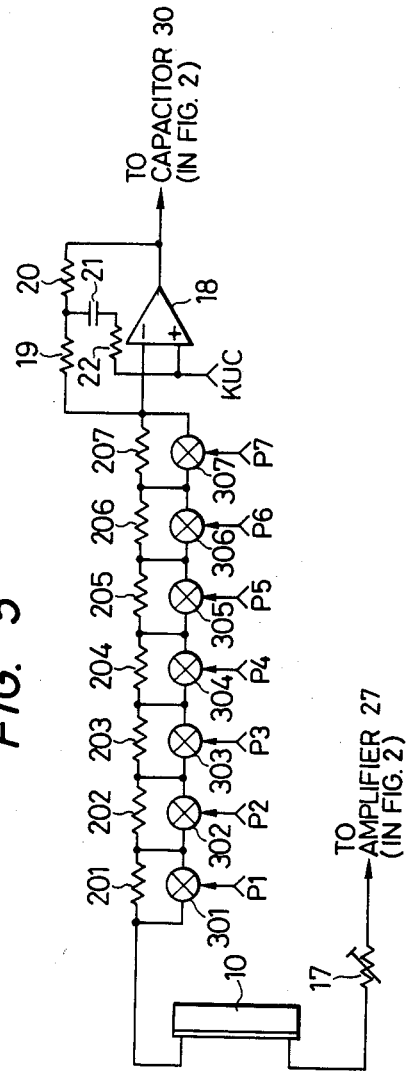
FIG. 5 is a circuit diagram of a fourth embodiment of the present invention.
Figure 6:
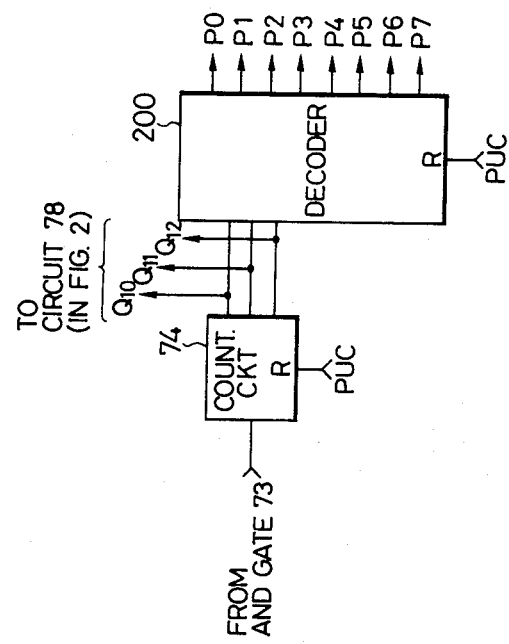
FIG. 6 shows a relation between an input and an output of a decoder shown in FIG. 5.

FIG. 5 shows a circuit diagram of a fourth embodiment of a camera in accordance with the present invention, and FIG. 6 shows a relation between an input and an output of a decoder 200 shown in FIG. 5. In the fourth embodiment of FIG. 4, instead of the resistors 11–13 (FIG. 4) connected in parallel through the analog switches 14–16, series-connected resistors 201–207 are used as output current switching impedance elements for the PSD 10. Other circuit components and the operation are similar to those of the first embodiment and only the different is explained below.

Numerals 301–307 denote known analog switches which are connected in parallel to the resistors 201–207, respectively. They are sequentially controlled by outputs P0–P7 of the decoder 200. As the counting by a counter 74 proceeds, the resistors 201–207 are sequentially shorted. The decoder 200 has an input-output relation as shown in FIG. 6. For example, when all of the outputs Q10–Q12 of the counter 74 are H-level, all of the output terminals P0–P7 are H-level and all of the analog switches 301–307 are rendered conductive.

In the fourth embodiment shown in FIG. 5, when the switch 61 (FIG. 2) is closed, the counting by the counter 74 is started and the outputs of the decoder 200 are sequentially changed to H-level as shown in FIG. 6. Accordingly, the resistors 201–207 are sequentially shorted. Thus, as the counting proceeds, the resistance of the resistors 201–207 gradually decreases and the current flowing into the operational amplifier from the PSD 10 gradually increases. When the output level of the operational amplifier 50 exceeds the reference level of the comparator 54, the RS-FF 55 is set and produces the AFEND signal.

In the first and fourth embodiments of the prevent invention, the impedance means connected to the output terminal of the PSD are resistors, and in the second and third embodiment, it is the resistance between the source and the drain of the FET. Any other variable impedance element may be used.

Figure 7:
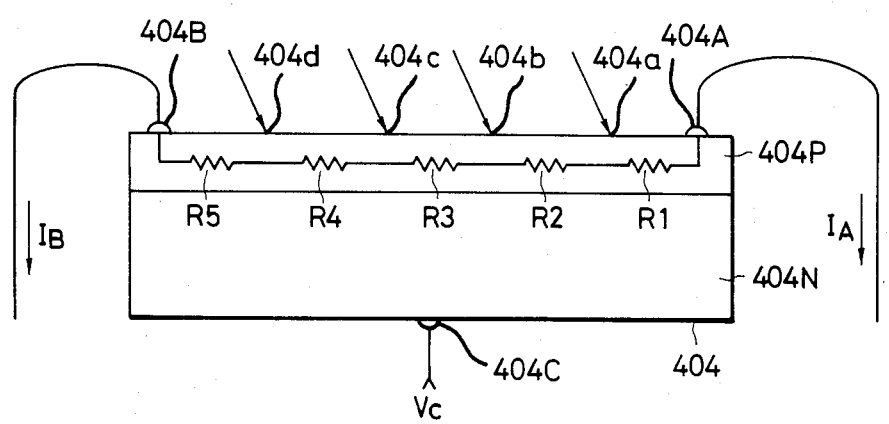

FIG. 7 is a sectional view showing a structure of a PSD 404 in a fifth embodiment of the present invention. Numeral 404N denotes an N-type semiconductor layer, and numeral 404P denotes a P-type semiconductor layer which laterally has equivalent resistances R1, R2, R3, R4 and R5, where R1 is a resistance between terminal 404A to a point 404a, R2 is resistance between points 404a to 404b, R3 is a resistance between points 404b to 404c, R4 is a resistance between points 404c to 404d, and R5 is a resistance between points 404d to 404B. When a reflected light spot does not impinge to the PSD, the P-N junction remains reverse-biased and no current flows. When the light spot impinges, electron-hole pairs are generated, a current flows through the P-N junction and hence currents $I_A$ and $I_B$ flow.

Table 1 below show a relationship between the output currents $I_A$ and $I_B$ when the reflected light spot is focused onto the points 404a, 404b, 404c and 404d, respectively, on the PSD 404. I represents a sum of $I_A$ and $I_B$.

| | $I_A$ | $I_B$ |
|---|---|---|
| 404a | $\dfrac{R_2 + R_3 + R_4 + R_5}{R_1 + R_2 + R_3 + R_4 + R_5} I$ | $\dfrac{R_1}{R_1 + R_2 + R_3 + R_4 + R_5} I$ |
| 404b | $\dfrac{R_3 + R_4 + R_5}{R_1 + R_2 + R_3 + R_4 + R_5} I$ | $\dfrac{R_1 + R_2}{R_1 + R_2 + R_3 + R_4 + R_5} I$ |
| 404c | $\dfrac{R_4 + R_5}{R_1 + R_2 + R_3 + R_4 + R_5} I$ | $\dfrac{R_1 + R_2 + R_3}{R_1 + R_2 + R_3 + R_4 + R_5} I$ |
| 404d | $\dfrac{R_5}{R_1 + R_2 + R_3 + R_4 + R_5} I$ | $\dfrac{R_1 + R_2 + R_3 + R_4}{R_1 + R_2 + R_3 + R_4 + R_5} I$ |

Figure 8:
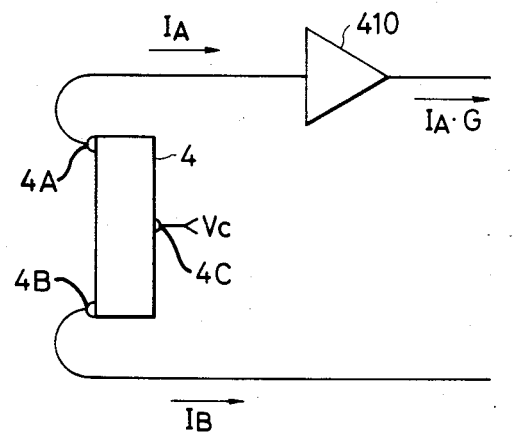
Figures 9, 9A:
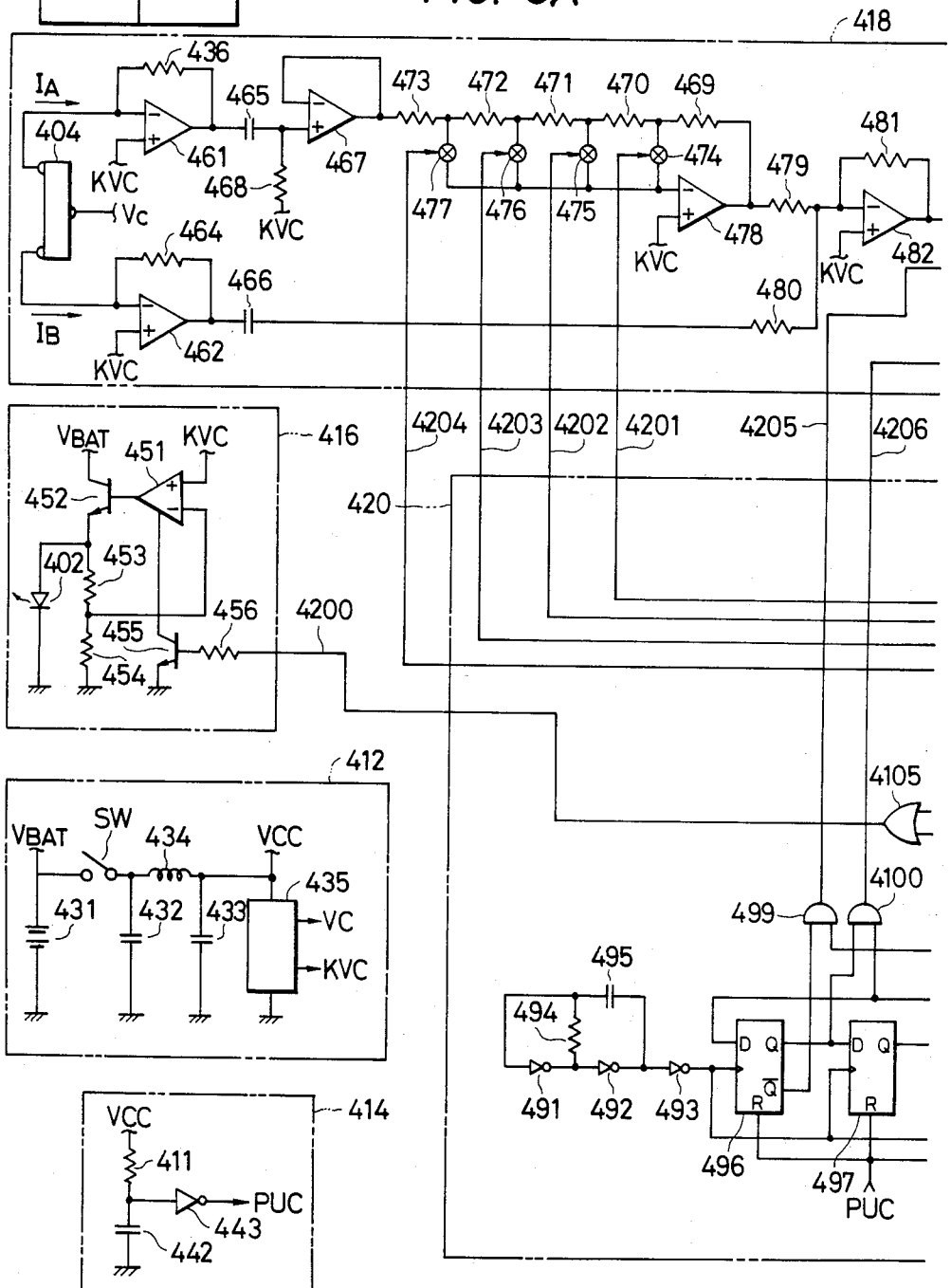
Figure 9B:
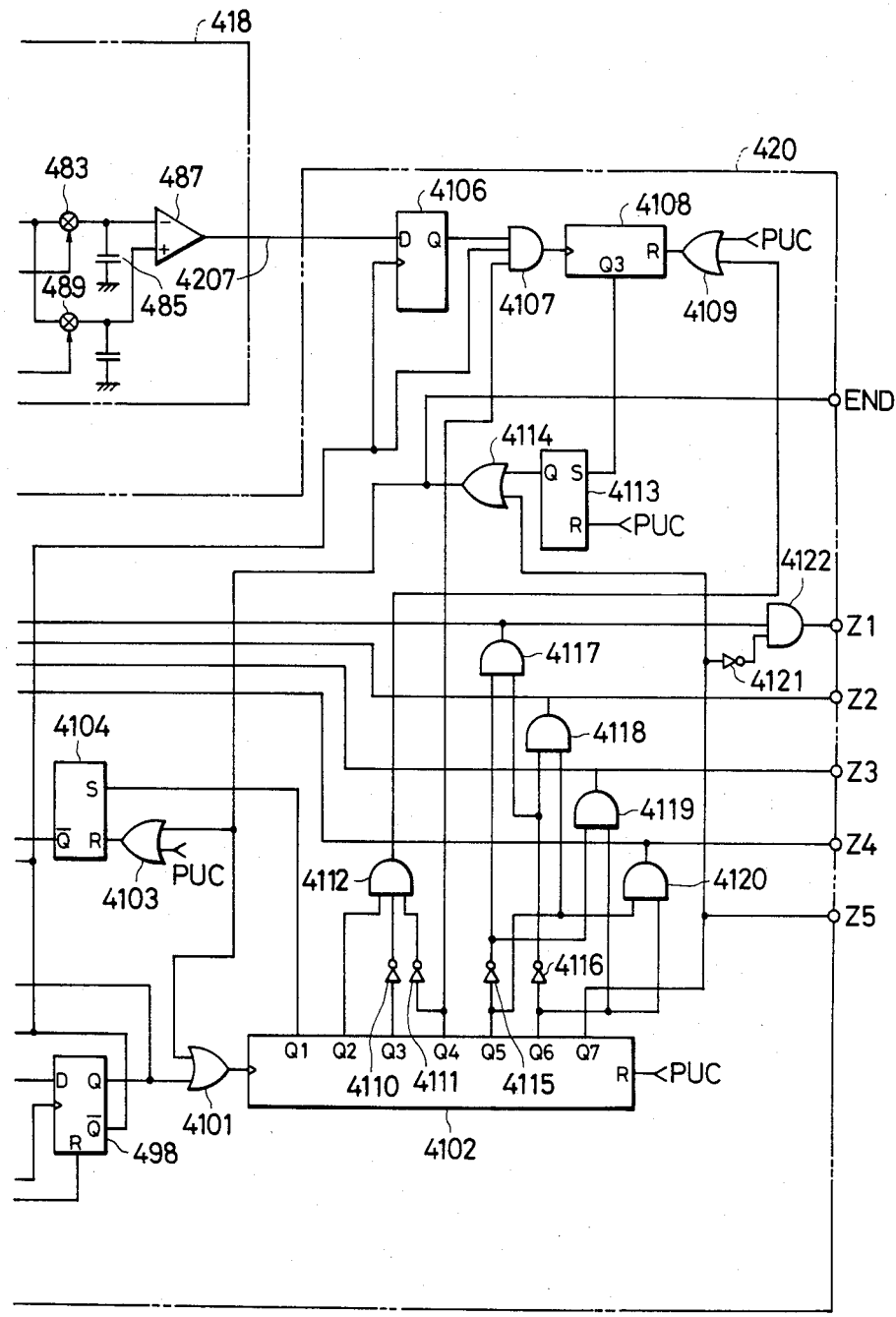

FIG. 8 shows a principle of signal processing in the embodiment of FIG. 7. Numeral 410 denotes an amplifier which amplifes one (e.g. $I_A$) of the output currents of the PSD 404, having an amplification factor G. As is apparant from FIG. 7, when the pulse light reflected by an object (not shown) is focused at the point 404a on the PSD 404, $G=R1/(R2+R3+R4+R5)$ and $I_A \cdot G = I_B$, when it is focused at the point 404b, $G=(R1+R2)/(R3+R4+R5)$ and $I_A \cdot G = I_B$, when it is focused at the point 404C, $G=(R1+2+R3)/(R4+R5)$ and $I_A \cdot G = I_B$, and when it is focused at the point 404d, $G=(R1+R2+R3+R4)/R5$ and $I_A \cdot G = I_B$. Accordingly, a relationship between the amplification factor G and the focusing points for $I_A \cdot G > I_B$ and $I_A \cdot G < I_B$ is shown in Table 2.

| G | $I_A \cdot G > I_B$ | $I_A \cdot G < I_B$ |
|---|---|---|
| $\dfrac{R_1}{R_2 + R_3 + R_4 + R_5}$ | 404A~404a | 404a~404B |
| $\dfrac{R_1 + R_2}{R_3 + R_4 + R_5}$ | 404A~404b | 404b~404B |
| $\dfrac{R_1 + R_2 + R_3}{R_4 + R_5}$ | 404A~404c | 404c~404B |
| $\dfrac{R_1 + R_2 + R_3 + R_4}{R_5}$ | 404A~404d | 404d~404B |

When $G=R1/(R2+R3+R4+R5)$, the focusing point is between 404A and 404a if $I_A \cdot G > I_B$, and between 404a and 404B if $I_A \cdot G < I_B$. Similarly, when $G=(R1+R2)/(R3+R4+R5)$, the focusing point is between 404A and 404b if $I_A \cdot G > I_B$, and between 404b and 404B if $I_A \cdot G < I_B$. When $G=(R1+R2+R3)/(R4+R5)$, the focusing point is between 404A and 404c if $I_A \cdot G > I_B$, and between 404c and 404B if $I_A \cdot G < I_B$. When $G=(R1+R2+R3+R4)/R5$, the focusing point is between 404A and 404d if $I_A \cdot G > I_B$, and between 404B and 404d if $I_A \cdot G < I_B$. Accordingly, by sequentially changing the amplification factor G to R1/(R2+R3+R4+R5), (R1+R2)/(R3+R4+R5), (R1+R2+R3)/(R4+R5) and (R1+R2+R3+R4)R5 and comparing $I_A \cdot G$ with $I_B$ for each amplification factor G, it is possible to detect which one of points between 404A and 404a, 404a and 404b, 404b and 404c, 404c and 404d, and 404d and 404B the focusing point is.

Referring to FIGS. 9 to 12, a modification of the signal processing apparatus shown in FIG. 7 is now explained. When a user of a camera depresses a shutter release button (not shown), a switch SW is turned on and powers VCC, VC and KVC are generated by a power supply block 412. As the power VCC is supplied, a PUC signal block 414 generates an H-level PUC signal for a period determined by a time constant of a resistor 441 and a capacitor 442 and a threshold of an inverter 443. Flip-flops 496, 497, 498 and 411 and a counter 4102 are reset by the PUC signal. A flip-flop 4104 is also reset through an OR gate 4103, and a counter 4108 is reset through an OR gate 4109. As the flip-flop 4104 is reset, a $\overline{Q}$-output thereof is rendered H-level and a control signal 4200 is also rendered H-level through an OR gate 4105. Accordingly, a transistor 455 of a light projection block 416 is rendered conductive and an IRED 402 is turned off. Since the counter 4102 has been reset, a Q7 output thereof is L-level, and since the FF 4113 has also been reset, a Q output thereof is L-level. Accordingly, an output of an OR gate 4114 is L-level. Since Q2-output, Q3 output and 4 output of the counter 4102 are L-level, an output of an AND gate 4112 is also L-level. Since Q5 output and Q6 output of the counter 4102 are L-level, an output of a inverter 4115 is H-level and an output of an inverter 4116 is also H-level. As a result, an output of an AND gate 4117 is H-level, an output of an AND gate 4118 is L-level, an output of an AND gate 4119 is L-level and output of an AND gate 4120 is L-level.

When the PUC signal returns to L-level from H-level, the resetting of the flip-flops and the counters is released. The operation is explained with reference to a timing chart shown in FIG. 10. In FIG. 10, (a) shows the PUC signal, (b) shows the output of the inverter 493, (c) shows the Q output of the flip-flop 498, (d) shows the Q1 output of the counter 4012, (e) shows the $\overline{Q}$ output of the flip-flop 4104 and (f) shows the output of the OR gate 4105. When the resetting by the PUC signal shown in FIG. 10(a), the flip-flops 496, 497 and 498 is released, the flip-flops are clocked by the output of the inverter 493 shown in FIG. 10(b) so that the Q output of the flip-flop 498 changes as shown in FIG. 10(c). Since the Q output of the FF 498 clocks the counter 4102 through the OR gate 4101, the Q1 output of the counter 4102 changes as shown in FIG. 10(d). Since the FF 4104 is set by the Q1 output of the counter 4102, the Q output thereof changes to L-level as shown in FIG. 10(e). When the $\overline{Q}$ output of the FF 4104 changes to L-level, the output of the OR gate 4105 changes as shown in FIG. 10(f) such that the $\overline{Q}$ output of the FF 498 passes therethrough and the IRED 402 is flashed by the control signal 4200. The light projected by the IRED 402 is reflected by an object and the reflected light is focused on the PSD 404.

Assuming that the object is at a near point, the reflected light spot is focused at a point between 404A and 404a shown in FIG. 7. FIG. 11 shows signal waveforms of elements in a photosensing block 418. In FIG. 11, (a)

shows a flashing waveform of the IRED 202 (L-level represents turn-off and H-level represents turn-on), (b) shows a waveform at a junction of a capacitor 465 and a resistor 468, (c) shows a waveform at a junction of a capacitor 466 and a resistor 480, (d) shows an output waveform of an operational amplifier 478, (e) shows an output waveform of a operational amplifier 482, (f) shows a waveform of a control signal 4205, (g) shows a waveform of a control signal 4206, (h) shows a voltage waveform at an inverting input terminal of a comparator 487, (i) shows a voltage waveform at a non-inverting input terminal of the comparator 487, and (j) shows an output waveform of the comparator 487. As the IRED 402 flashes as shown in FIG. 11(a), AC signals having a reference KVC and corresponding to the output currents $I_A$ and $I_B$ from the PSD 404 as shown in FIGS. 11(b) and 11(c) are generated at the junction of the capacitor 465 and the resistor 468, and the junction of the capacitor 466 and the resistor 480. Since the operational amplifier 467 functions as a buffer amplifier, the output voltage waveform of the operational amplifier 467 is identical to the waveform shown in FIG. 11(b). Since only the control signal 4201 of the control signals 4201, 4202, 4203 and 4204 is initially H-level, only an analog switch 474 of analog switches 474, 475, 476 and 477 is on. A gain G of an inverting amplifier constructed by a resistor 469 (having a resistance $R_1'$), a resistor 470 ($R_2'$), a resistor 471 ($R_3'$), a resistor 472 ($R_4'$), a resistor 473 ($R_5'$) and an operational amplifier 478 is $-R_1'/(R_2'+R_3'+R_4'+R_5')$ and the operational amplifier 478 produces an output voltage as shown in FIG. 11(d). Assuming that the resistance $R_1$, $R_2$, $R_3$, $R_4$ and $R_5$ of the PSD 404 and the resistances $R_1'$, $R_2'$, $R_3'$, $R_4'$ and $R_5'$ have the following relationship:

$$\frac{R_1'}{R_1} = \frac{R_2'}{R_2} = \frac{R_3'}{R_3} = \frac{R_4'}{R_4} = \frac{R_5'}{R_5} = m$$

the gain G is represented by $$G = \frac{mR_1}{mR_2 + mR_3 + mR_4 + mR_5} = \frac{R_1}{R_2 + R_3 + R_4 = R_5}$$

as seen from Table 2, $I_A \cdot (-G) > I_B$. Accordingly, $I_A \cdot G + I_B < 0$.

Thus, the output voltage of the adder constructed by the resistors 479, 480 and 481 and the operational amplifier 482 is under KVC when the IRED 402 is turned on and over KVC when the IRED 402 is turned off, as shown in FIG. 11(e). The control signal 4205 for the analog switch 483 is H-level when the IRED 402 is turned on as shown in FIG. 11(f) so that the voltage sampled and held in the capacitor 485 is under KVC as shown in FIG. 11(h). The control signal 4206 for the analog switch 484 is H-level when the IRED 402 is turned off as shown in FIG. 11(g) so that the voltage sampled and held in the capacitor 486 is over KVC. Accordingly, the voltage at the non-inverting input terminal of the comparator 487 is higher than the voltage at the inverting input terminal, the output of the comparator 487 is H-level as shown in FIG. 11(j). The output of the comparator 487 is transmitted to a control block 420 as an output signal 4207.

On the other hand, the control block 420 issues an END signal. The operation therefor is explained with reference to a timing chart shown in FIG. 12. In FIG. 12(a) shows the output of the AND gate 4117, (b) shows the flashing waveform of the IRED 402, (c) shows the Q2 output of the counter 4102, (d) shows the Q3 output of the counter 4102, (e) shows the Q4 output of the counter 4102, (f) shows the output of the comparator 487, (g) shows the Q output of the FF 4106, (h) shows the output of the AND gate 4107, (i) shows the Q3 output of the counter 4108, and (j) shows the output of the OR gate 4114. The output of the AND gate 4117 is rendered H-level by the PUC signal as shown in FIG. 12(a) and the gain of the operational amplifier 478 is determined. Since the Q7 output of the counter 4102 is now L-level, the output of the inverter 4121 is H-level and a Z1 signal is also H-level. As the resetting by the PUC signal is released, the IRED 402 starts flashing as shown in FIG. 12(b) and the counter 4102 starts counting as shown in FIGS. 12(c), 12(d) and 12(e). As the IRED 402 starts flashing, the light sensed by the PSD 404 is processed by the sensing block 418 and the output of the comparator 487 is rendered H-level as shown in FIG. 12(f). The FF 4106 receives the output of the comparator 487 and is rendered H-level. As the count in the counter 4102 is advanced and the Q4 output changes to H-level as shown in FIG. 12(e), the AND gate 4107 passes the $\overline{Q}$ output of the FF 498 as shown in FIG. 12(h) because the Q output of the FF 4106 is H-level. The counter 4108 counts the pulses from the AND gate 4107, and when the count reaches 4, the Q3 output changes to H-level as shown in FIG. 12(i). The FF 4113 is set by the rise of the Q3 output of the counter 4108 so that the $\overline{Q}$ output thereof is rendered H-level. Accordingly, the output of the OR gate 4114 is rendered H-level as shown in FIG. 12(j). When the output of the OR gate 4114 is rendered H-level, the output of the OR gate 4103 is rendered H-level, the FF 4104 is reset and the $\overline{Q}$ output thereof is rendered H-level. Accordingly, the output of the OR gate 4105 is rendered H-level and the IRED 402 is turned off. The output of the OR gate 4101 is rendered H-level and the counter 4102 stops counting. The control block 420 generates the END signal which indicates the end of distance measurement and an H-level Z1 signal which is a zone signal.

Assuming now that the object is at a distant point, the reflected light spot is focused at a point between 404b and 404c shown in FIG. 7. Thus, in a similar manner to that described above, a Z3 signal is rendered H-level when the counter 4102 stops counting so that the distance to the object is detected.

While the principle and the embodiments of the present invention have been shown and described in connection with the PSD as the photosensing device, the present invention is not restricted to the PSD but other photosensing device such as one shown in FIG. 13 may be used. In FIG. 13, numerals 4301 and 4302 denote silicon photo-diodes, and numerals 4303, 4304 and 4305 denote spot images of the IRED. The silicon photo-diodes 4301 and 4302 may be of triangle shape with their oblique sides facing to each other. The IRED spot image is focused at a point 4303 when the object is at a near point, at a point 4304 when the object is at an intermediate point, and at a point 4305 when the object is at a distance point. Since the focusing point of the spot image of the IRED changes with the distance to the object, the relative light intensities of the lights impinged to the silicon photo-diodes 4301 and 4302 change and the relative photo-currents generated in the silicon photo-diodes 4301 and 4302 also change. Thus, the distance information can be obtained by changing the gain of one amplifier and comparing it with that of the other amplifier.

While a one-dimension PSD signal processing apparatus has been shown and described, a pair of such signal processing apparatus may be used when it is applied to a two-dimension PSD.

As described above, in accordance with the present invention, in the signal processing apparatus for detecting the position of the incident spot light to the PSD whose output continuously varies with the position of the incident spot light, there are provided the impedance means connected to at least one output terminal of a pair of output terminals of the one-dimension PSD or at least one output terminal of each of two pairs of output terminals for the two-dimension PSD, the impedance changing means for changing the impedance of the impedance means, the detection means for detecting the output current from the output terminal, and the means for detecting the position of the incident spot light in accordance with the impedance of the impedance means when the output of the pair of output terminals detected by the detection means balance while the impedance of the impedance means is changed by the impedance changing means. Accordingly, the normalization circuit is not necessary as opposed to the prior art PSD signal processing circuit, the incident spot light position can be precisely detected with a simple construction, the dynamic range of the signal processing apparatus can be narrowed and the circuit configuration can be simplified.

The detection means for detecting the output currents of the PSD 10 is the operational amplifier 34, the means for detecting the position of the incident spot light based on the output of the detection means when the output currents of the PSD balance are the operational amplifier 54, the RS-FF 55 and the counter 74 which stops counting in response to the output of the RS-FF 55, and the means for changing the impedance of the impedance means are the analog switches 14 - 16 in the first embodiment, the constant current source 101, the transistors 102 and 103 and the capacitor 104 in the second embodiment, and the D/A converter with D/A converts the output of the counter 74 in the third embodiment.

What is claimed is:

1. A signal processing apparatus for a semiconductor position sensing device having two output terminals, comprising:
    (a) variable impedance means connected to at least one terminal of said output terminals;
    (b) impedance varying means connected to said variable impedance means for varying an impedance of said variable impedance means;
    (c) detecting means functionally connected to said two output terminals for producing a third output signal based on first and second output signals from said position sensing device; and
    (d) output means connected to said detecting means for producing fourth output signal representing a position of an incident light to said position sensing device in accordance with the impedance of said variable impedance means when said third output signal represents that said first output signal and said second output signal are in a predetermined relationship as said impedance varying means varies the impedance of said variable impedance means.

2. A signal processing apparatus according to claim 1 wherein said variable impedance means includes a plurality of resistors.

3. A signal processing apparatus according to claim 2 wherein said impedance varying means includes a plurality of switches and said resistors are connected in parallel through said switches.

4. A signal processing apparatus according to claim 2 wherein said resistors are included in series and said impedance varying means includes switches connected in parallel with said resistors, respectively.

5. A signal processing apparatus according to claim 3 wherein said output means includes signal generating means for generating trigger signals for actuating said switches in a predetermined sequence.

6. A signal processing apparatus according to claim 4 wherein said output means includes signal generating means for generating trigger signals for actuating said switches in a predetermined sequence.

7. A signal processing apparatus according to claim 5 wherein said signal generating means includes a counter for counting input pulses thereto to generate the trigger signals in accordance with the count of said counter.

8. A signal processing apparatus according to claim 5 wherein said signal generating means includes a counter for counting input pulses thereto, and a decoder for decoding the output of said counter to generate the trigger signals related to the count of said counter.

9. A signal processing apparatus according to claim 3 wherein said output means includes:
    (a) signal generating means for generating trigger signals for actuating said switches in a predetermined sequence; and
    (b) control means connected between said detecting means and said signal generating means for interrupting the generation of the trigger pulse by said signal generating means when said third output signal represents that said first output signal and said second output signal are in a predetermined relationship as said impedance varying means varies the impedance of said variable impedance means; the trigger signal from said signal generating means representing a position of an incident light to said position sensing device in accordance with the impedance of said variable impedance means when said control means interrupts the generation of the trigger signal.

10. A signal processing apparatus according to claim 4 wherein said output means includes:
    (a) signal generating means for generating trigger signals for actuating said switches in a predetermined sequence; and
    (b) control means connected between said detecting means and said signal generating means for interrupting the generation of the trigger pulse by said signal generating means when said third output signal represents that said first output signal and said second output signal are in a predetermined relationship as said impedance varying means varies the impedance of said variable impedance means; the trigger signal from said signal generating means representing a position of an incident light to said position sensing device in accordance with the impedance of said variable impedance means when said control means interrupts the generation of the trigger signal.

11. A signal processing apparatus for a semiconductor position sensing device having two output terminals for producing first and second output signals, respectively, in accordance with a position of an incident light to said position sensing device, comprising:
- (a) variable impedance means connected to at least one of said output terminals;
- (b) impedance varying means connected to said variable impedance means for varying an impedance of said variable impedance means;
- (c) activation means functionally connected to said impedance varying means for activating said impedance varying means;
- (d) detecting means functionally connected to said two output terminals of said position sensing device for producing a third output signal when the first and second output signals from said position sensing device are in a predetermined relationship; and
- (e) output means responsive to the third output signal from said detecting means for producing a fourth output signal representing the impedance of said variable impedance means at the time of the generation of the third output signal, said fourth output signal representing a position of an incident light on said position sensing device.

12. A signal processing apparatus according to claim 11 wherein said output means is activated by said activation means and produces the fourth output signal in accordance with the variation of the impedance of said variable impedance means.

13. A distance measuring apparatus for a camera having a semiconductor position sensing device with two output terminals, for producing first and second output signals in accordance with a position of an incident light on said position sensing device, comprising:
- (a) means for emitting a light to be projected to an object under distance measurement;
- (b) variable impedance means connected to at least one of said output terminals;
- (c) impedance varying means connected to said variable impedance means for varying an impedance of said variable impedance means;
- (d) activation means functionally connected to said impedance varying means for activating said impedance varying means;
- (e) detecting means functionally connected to said two output terminals of said position sensing device for producing a third output signal when the first and second output signals from said position sensing device are in a predetermined relationship; and
- (f) output means responsive to the third output signal from said detecting means for producing a fourth output signal representing the impedance of said variable impedance means at the time of the generation of the third output signal, said fourth output signal representing a distance to the object.

* * * * *

UNITED STATES PATENT AND TRADEMARK OFFICE
CERTIFICATE OF CORRECTION

PATENT NO. : 4,682,872

DATED : July 28, 1987

INVENTOR(S) : RYOICHI SUZUKI, ET AL.

It is certified that error appears in the above-identified patent and that said Letters Patent is hereby corrected as shown below:

COLUMN 2

Line 27, "illustrates" should read --illustrate--.
    Line 66, "a" should be deleted.

COLUMN 3

Line 35, "current" should read --currents--.

COLUMN 4

Line 34, "Q-output," should read --$\bar{Q}$-output,--.

COLUMN 5

Line 2, "9" should read --90--.
    Line 19, "coindidence" should read --coincidence--.
    Line 50, "chargers" should read --changes--.

COLUMN 6

Line 19, "amplifir" should read --amplifier--.
    Line 48, "turn" should read --turns--.

COLUMN 7

Line 3, "a" should be deleted.
    Line 8, "and" (first occurrence) should read --an--.

UNITED STATES PATENT AND TRADEMARK OFFICE
CERTIFICATE OF CORRECTION

PATENT NO. : 4,682,872
DATED : July 28, 1987
INVENTOR(S) : RYOICHI SUZUKI, ET AL.

It is certified that error appears in the above-identified patent and that said Letters Patent is hereby corrected as shown below:

COLUMN 8

Line 6, "scond" should read --second--.
Line 7, "embodiment" should read --embodiments--.
Line 42, "prevent" should read --present--.
Line 45, "embodiment," should read --embodiments,--.

COLUMN 9

Line 18, "apparant" should read --apparent--.
Line 23, "404C," should read --404c,--.
Line 45, "404aif" should read --404a if--.
Line 48, "404bif" should read --404b if--.
Line 57, "(R1+R2+R3+R4)R5" should read --(R1+R2+R3+R4)/R5--.

COLUMN 10

Line 32, "4" should read --Q4--.
Line 39, "and output" should read --and an output--.
Line 57, "Q output" should read --$\bar{Q}$ output--.

COLUMN 11

Line 7, "a" should read --an--.
Line 27, "($R_4$ ')." should read --($R_4$ '),--.
Line 31, "resistance" should read --resistances--.

UNITED STATES PATENT AND TRADEMARK OFFICE
CERTIFICATE OF CORRECTION

PATENT NO. : 4,682,872                  Page 3 of 3

DATED : July 28, 1987

INVENTOR(S) : RYOICHI SUZUKI, ET AL.

It is certified that error appears in the above-identified patent and that said Letters Patent is hereby corrected as shown below:

COLUMN 12

Line 30, "Q output" should read --$\overline{Q}$ output--.
Line 62, "distance" should read --distant--.

Signed and Sealed this

Tenth Day of May, 1988

Attest:

DONALD J. QUIGG

Attesting Officer        Commissioner of Patents and Trademarks